United States Patent
Ashokkumar et al.

(10) Patent No.: US 10,705,921 B2
(45) Date of Patent: Jul. 7, 2020

(54) CLIENT DATA DRIVEN SMART BACKUP SCHEDULER

(71) Applicant: EMC IP Holding Company LLC, Hopkinton, MA (US)

(72) Inventors: Pravin Kumar Ashokkumar, Bangalore (IN); Sunder Ramesh Andra, Bangalore (IN); Elakkuvan Chidambaram, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 23 days.

(21) Appl. No.: 16/050,324

(22) Filed: Jul. 31, 2018

(65) Prior Publication Data

US 2020/0042400 A1 Feb. 6, 2020

(51) Int. Cl.
*G06F 11/14* (2006.01)
*H04L 29/08* (2006.01)

(52) U.S. Cl.
CPC ...... *G06F 11/1461* (2013.01); *G06F 11/1451* (2013.01); *G06F 11/1469* (2013.01); *H04L 67/22* (2013.01)

(58) Field of Classification Search
CPC ..... G06F 11/1461–1469; G06F 11/1448–1451
See application file for complete search history.

(56) References Cited

U.S. PATENT DOCUMENTS

| 7,085,904 B2 * | 8/2006 | Mizuno | G06F 11/1451 707/999.202 |
| 8,260,750 B1 * | 9/2012 | Gugick | G06F 11/1461 707/645 |
| 8,285,850 B1 * | 10/2012 | Jones | H04L 47/20 709/227 |
| 8,762,341 B1 * | 6/2014 | Mahajan | G06F 11/1448 707/640 |
| 9,201,941 B1 * | 12/2015 | Emigh | G06F 11/1453 |
| 9,519,432 B1 * | 12/2016 | Haustein | G06F 11/1458 |
| 10,162,709 B1 * | 12/2018 | Lazier | G06F 11/1451 |
| 10,303,782 B1 * | 5/2019 | Zhu | G06F 11/1451 |

(Continued)

OTHER PUBLICATIONS

Hao Cheng, Y.H. Ho, K.A. Hua, Danzhou liu, Fei Xie, Ynn-Pyng Tsaur, A Service-Oriented Approach to Storage Backup, 2008 IEEE International Conference on Services Computing (vol. 2). (Year: 2008).*

(Continued)

*Primary Examiner* — Khoa D Doan
(74) *Attorney, Agent, or Firm* — Staniford Tomita LLP

(57) ABSTRACT

A first threshold corresponds to a data change at which a backup is triggered. A second threshold corresponds to a time interval at which the backup is triggered. A client is polled to obtain a first value indicating an amount of data changed since a last backup. A second value is tracked indicating an amount of time elapsed since the last backup. A determination is made as to whether to trigger the backup based on at least one of the first value exceeding the first threshold or the second value exceeding the second threshold. When the backup is not triggered because neither the first value exceeds the first threshold nor the second value exceeds the second threshold, the backup is triggered regardless based on a degree to which the first threshold has been reached, a degree to which the second threshold has been reached, and current usage of resources.

15 Claims, 8 Drawing Sheets

(56) References Cited

U.S. PATENT DOCUMENTS

| | | | |
|---|---|---|---|
| 10,387,073 B2* | 8/2019 | Bhagi | G06F 11/1464 |
| 10,459,801 B2* | 10/2019 | Bangalore | G06F 16/2358 |
| 2003/0018657 A1* | 1/2003 | Monday | G06F 16/10 |
| 2003/0229653 A1* | 12/2003 | Nakanishi | G06F 11/1451 |
| 2004/0054697 A1* | 3/2004 | Tsaur | G06F 11/1451 |
| 2005/0038836 A1* | 2/2005 | Wang | G06F 3/0601 |
| 2007/0136381 A1* | 6/2007 | Cannon | G06F 11/1451 |
| 2007/0250671 A1* | 10/2007 | Lyon | G06F 11/1453 711/162 |
| 2009/0177856 A1* | 7/2009 | Herne | G06F 11/1464 711/162 |
| 2009/0210462 A1* | 8/2009 | Arakawa | G06F 11/1458 |
| 2009/0281690 A1* | 11/2009 | Sasaki | G06F 11/1441 701/33.4 |
| 2010/0070475 A1* | 3/2010 | Chen | G06F 11/1451 707/640 |
| 2010/0169590 A1* | 7/2010 | Gordon-Carroll | G06F 11/1451 711/162 |
| 2012/0089572 A1* | 4/2012 | Raichstein | G06F 16/174 707/645 |
| 2014/0046903 A1* | 2/2014 | Yin | H04W 8/30 707/644 |
| 2014/0289202 A1* | 9/2014 | Chan | G06F 9/54 707/652 |
| 2015/0081633 A1* | 3/2015 | Su | H04L 41/0856 707/634 |
| 2015/0347430 A1* | 12/2015 | Ghosh | G06F 11/1451 707/649 |
| 2015/0347548 A1* | 12/2015 | Mortensen | G06F 16/27 707/618 |
| 2016/0034357 A1* | 2/2016 | Anglin | G06F 11/1458 714/4.11 |
| 2018/0067813 A1* | 3/2018 | Venkatesh | G06F 11/14 |
| 2018/0260284 A1* | 9/2018 | Konetski | G06F 11/1448 |
| 2019/0132431 A1* | 5/2019 | Ziv | G06F 3/0619 |

OTHER PUBLICATIONS

S. Suguna and A. Suhasini, "Overview of data backup and disaster recovery in cloud," International Conference on Information Communication and Embedded Systems (ICICES2014), Chennai, 2014, pp. 1-7. (Year: 2014).*

* cited by examiner

CLIENT DATA DRIVEN SMART BACKUP SCHEDULER

TECHNICAL FIELD

The present invention relates generally to information processing systems, and more particularly to backing up data.

BACKGROUND

Generally, a backup involves making a copy of data to help protect against data loss. Existing backup systems perform backups according to times that are defined in schedule policies. These schedule polices are based only on time intervals and are very rigid because they are mainly time bound. This leads to inefficient backups and also hinders the performance of both the backup and the client system.

For example, when the client system is processing a large production workload and the amount of data to backup is relatively small, performing a backup merely because a particular scheduled time for the backup has arrived is not efficient. The backup consumes additional resources and the client may be overburdened with the added backup activity.

There is a need for improved systems and techniques for intelligent backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
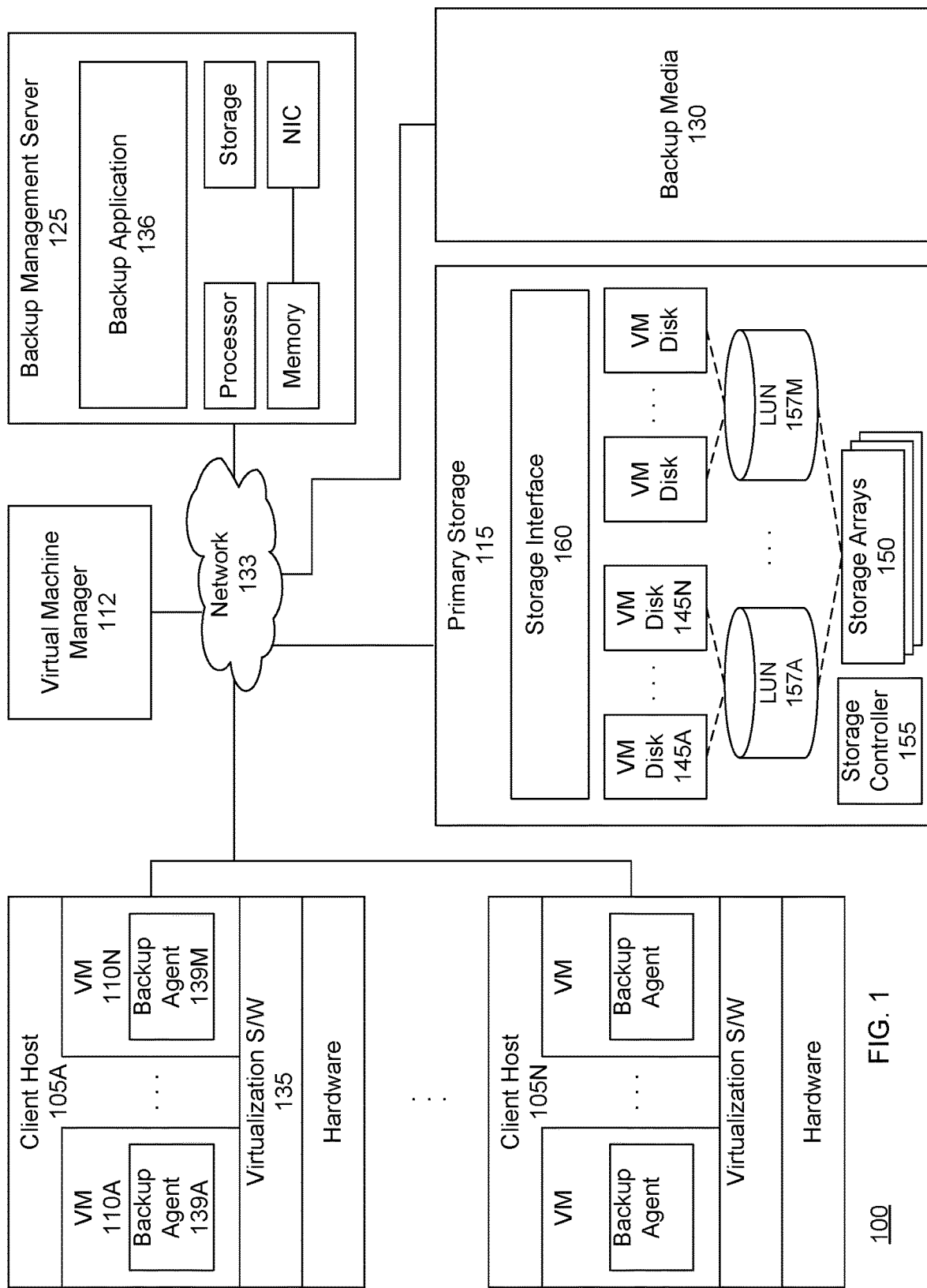
FIG. 1 shows a block diagram of an information processing system of a client data driven smart backup scheduler, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for implementing client data driven smart backup scheduling. FIG. 1 shows a simplified block diagram of a computer network or information processing system 100 in which client data driven smart backup scheduling may be implemented. System 100 includes any number of client hosts 105A-N, each hosting any number of virtual machines 110A-N, a virtual machine manager 112 managing the virtual machines, primary storage 115 storing data of the virtual machines, a backup management server 125, and backup media 130, each of which are interconnected by a network 133.

The network may be a cloud network, local area network (LAN), wide area network (WAN), or other appropriate network. The network provides connectivity to the various systems, components, and resources of system 100, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each virtual machine, or other type of centralized network server.

A client host may be a physical computing platform having a hardware platform that includes computing components such as a processor, memory, and so forth. In an embodiment, the host includes virtualization software 135 to support the execution of one or more virtual machines. A virtual machine is a software abstraction of a physical computing machine. A virtual machine is an operating system (OS) or application environment that is installed on software, which imitates dedicated hardware. Virtualization can limit costs by reducing the need for physical hardware systems.

In a specific embodiment, the virtualization software includes a hypervisor and a virtual machine management operating system. An example of a virtualization platform is Hyper-V from Microsoft Corporation of Redmond, Wash. It should be appreciated that while some embodiments are shown and described in conjunction with Hyper-V, aspects and principles of the system can be applicable to other virtualization platforms and services (e.g., vSphere as provided by VMware of Palo Alto, Calif.).

In a specific embodiment, the hypervisor is a thin layer of software between the hardware and virtual machines. The hypervisor is responsible for ensuring partition isolation and managing memory. A virtual machine management OS may be located in a specialized partition referred to as the parent partition and may include the virtualization stack and hardware specific device drivers. Virtual machines may be in guest partitions and may use the parent partition for their device access.

In other words, a virtual machine environment may utilize a hypervisor (e.g., Hyper-V) to create and run the virtual machines. A computer running the hypervisor may be referred to as a host machine and all virtual machines may be referred to as guest machines running guest operating systems (OS). The hypervisor provides the guest operating systems with a virtual operating platform and manages the execution of the VMs.

In a specific embodiment, backup agents, such as agents 139A-M, are provided at the client hosts. A backup agent may be installed inside or within each virtual machine of a client host. In another specific embodiment, a backup agent may be installed within a backup proxy server, separate from the client hosts, rather than being installed at each backup client. In this specific embodiment, the backup proxy server can provide backup services to multiple (e.g., two or more) virtual machines on multiple client hosts. In other words, the backup proxy server may backup a first virtual machine hosted by a first client, and a second virtual machine hosted by a second client, different from the first client. There can be many different configurations for the backup agents. A backup agent may be installed within a virtual machine management OS layer of the virtual machine.

In a specific embodiment, a backup agent is configured to operate with the Hyper-V hypervisor. In general, Hyper-V implements isolation of virtual machines in terms of a partition, which is a logical unit of isolation, supported by the hypervisor, in which each guest operating system executes. A hypervisor instance may include at least one parent partition. The virtualization stack runs in the parent partition and has direct access to the hardware devices. The parent partition then creates the child partitions which host the guest OSs. A parent partition creates child partitions using an API.

Storage for the virtual machines is provided by the primary storage system. For example, the virtual machines may use virtual volumes, virtual hard disks, or virtual machine disks 145A-N to store client or production data, operating system files, program files, installed applications, and other data associated with the activities of the virtual machines. Examples of virtual volume or disk formats include the VHD format as provided by Microsoft and the VMDK format as provided by VMware. The primary storage system may include any number of storage arrays 150 managed by a storage controller 155, and a storage interface 160 e.g., API. A storage array is a data storage system that may be used for block-based, file-based, or object storage. A storage array may include any number of hard disk drives, solid-state drives, or both (e.g., hybrid array). A storage array may be referred to as a disk array or flash array. The storage controller may expose the storage arrays as logical unit numbers (LUNs) 157A-M on which the virtual disks or virtual volumes of the virtual machines may be stored.

A LUN is a number or other identifier used to identify a logical storage unit. A disk may be configured as a single LUN or may include multiple disks. A LUN may include a portion of a disk, portions of multiple disks, or multiple complete disks. A virtual disk of the primary storage may be referred to as a primary disk, primary volume, virtual primary disk, or virtual primary volume. A virtual volume may be created from a LUN or a portion of a LUN. Each virtual volume (or virtual disk) may be associated with a single particular virtual machine. A virtual machine may be associated with multiple virtual volumes or virtual disks. In an embodiment, the virtual machine manager associates virtual volumes to the virtual machines. Through storage interface 160, the virtual disks may be exposed to other programs, applications, and components of system 100. Requests may be received through the storage interface to create snapshots, delete snapshots, copy data to the backup media, and so forth.

The virtual machine manager provides a central location to manage the virtual machines. Management tasks may include provisioning resources, adjusting compute, memory, and storage of the virtual machines, configuring the virtual machines, receiving commands and requests from the backup application, agent, or both, providing updates to the backup application, or agent, or both, tracking the health of the virtual machines and clients hosting the virtual machines, and so forth. Tracking health may include reporting usage of system or client resources used by the virtual machines. This may include, for example, system load, number of processes active over a rolling time period, average load over a rolling time period, processor utilization, memory usage, network usage, or disk performance, and the like.

The virtual machine manager may expose an API through which information about client or system health may be obtained. In a specific embodiment, one or more functions of virtual machine management may be provided by a virtual machine management service or operating system.

The backup media provides a target for the backup or copying of data from the primary storage of the client hosts. The backup media may be located at any number of persistent storage locations and devices, such as local client storage, server storage, or network storage, which may at least be partially implemented through storage device arrays, such as RAID components. In an embodiment, network 133 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology. An example of a backup target is Data Domain (DD) as provided by Dell EMC.

The backup management server may include a general purpose computer with software and hardware such as a processor, memory, storage, network interface card (NIC), and so forth. The backup management server may include a backup application 136 which coordinates with the backup agents, client hosts, storage controller, other components or combinations of these to backup or copy data from primary storage to the backup media.

In a specific embodiment, the backup system includes the backup application and backup agents. In a specific embodiment, the backup system includes logic to determine when a backup should be performed. The determination may be based on one or more factors, parameters, or criteria including a scheduled backup time, time elapsed since a last backup, data change rate, current client workload, current system load, current application load, current processing or CPU load, current network load, current storage array load (e.g., disk IO), other factors, or combinations of these.

In a specific embodiment, a customer user is prompted such as via a graphical user interface (GUI) of the backup system to configure one or more threshold limits or predefined values at which a backup may be triggered. These threshold limits may correspond to data changes, time durations, current resource usage, or combinations of these. A backup agent at a client host monitors one or more metrics associated with the one or more thresholds to determine when a backup of the client or, more particularly, one or more virtual machines hosted by the client, should be initiated. For example, a backup may be initiated when an amount of data changed since a last backup of the client exceeds a threshold data change limit, an amount of time elapsed since the last backup exceeds a threshold time limit, current usage of resources by the client is under a threshold usage level, a degree to which the threshold data change limit has been reached, a degree to which the threshold time limit has been reached, a degree to which the threshold usage level has been reached, or combinations of these.

The backup agents coordinate with the backup management server including backup application to backup client data (e.g., virtual machines) from primary storage to backup media. In a specific embodiment, when the backup agent determines that a backup of a client should be initiated or triggered, the backup agent generates and sends a backup request to the backup management server. The backup management server processes the backup request, and issues a backup work order to the client. The client, upon receipt of the backup work order, sends an acknowledgment of the work order to the backup management server and processes the backup work order. For example, the agent may direct or request that the virtual machine, databases, or other client activity be quiesced or temporarily suspended so that the virtual machine may be brought to a consistent state and a consistent snapshot for the backup may be taken. Data may then be copied using the snapshot to the backup media to fulfill the backup work order.

One example of a backup management server is the Avamar backup server as provided by Dell EMC of Hopkinton, Mass. Some embodiments are described in conjunction with the Avamar backup system. It should be appreciated, however, that aspects and principles of the systems and techniques described can be applied to other backup systems from other vendors of backup products.

As discussed, with existing traditional backups, schedule policies for backups are created and initiated based only on time interval with no other intelligence. These schedules are very rigid because they are mainly time bound.

In a specific embodiment, intelligence is provided in a backup such as by taking into account the client data change rate (for example, resilient change tracking (RCT) mechanism for Microsoft Hyper-V clients using respective Windows application programming interfaces (API's)), system and application loads to determine backup schedules and based on that with appropriate or corresponding threshold limits to initiate backup schedules for the client backups. Such systems and techniques allow for achieving scheduled backups in a smarter and more efficient way.

More particularly, a traditional backup scheduler runs only according to specified time intervals with no intelligence to it. Below are some drawbacks of traditional backup systems.

1) Backup Efficiency case: Consider, as an example, a spike in application activity, but the next scheduled time for a backup is still some time away. During phases of spikes in application activity, where a large amount of data is changed during a short period of time, if one were to wait for the next backup schedule based on time interval, the amount of data that is not protected will be very large. In other words, there may be a large amount of data that remains unprotected for quite some time until the next backup interval.

In a specific embodiment, a backup is triggered based on data change rate metrics. For example, a backup may be triggered when there is more than 1 percent of data change. This helps to ensure that at any given time the customer will not lose more than 1 percent of data. A regular backup schedule kicks off at regular time intervals even though it has just completed an on-demand backup which is not very efficient or beneficial. In this case as well, a new scheduler solution allows for having the backup scheduler initiate a backup after a specific interval of time.

2) Performance issue due to scheduled backup case: Consider, as another example, that a client is in the midst of processing a very large production workload and a scheduled time for a backup has just arrived. In another specific embodiment, another metric is based on the system/application load. In this specific embodiment, if the time for a backup according to a backup schedule happens during or coincides with a peak application load activity thereby reducing the system performance, the backup may be postponed and rescheduled to instead proceed when there is less usage of system resources (e.g., system resources are less than 75 percent used). This helps to ensure that the application performance is not adversely affected by the backup process.

In a specific embodiment, the backup application includes a backup scheduler that evaluates one or more attributes or parameters such as a data change rate value, system load value, application load value, time interval (based on the previous backup), or combinations of these to determine whether a backup should be initiated. In a specific embodiment, this system takes into account the above-mentioned parameters to satisfy multiple service level agreements (SLAs) to the customers based on their environmental needs.

In a specific embodiment, the system includes an agent running on the client which continuously or periodically polls the client for the following information: 1) data change rate, and 2) system/application workload. In other words, in a specific embodiment, there is a module running on the client machine which periodically monitors the client side threshold values and crossing any of these triggers the agent to kick-off a backup request to the backup server (e.g., Avamar backup server). The backup server, upon receipt of this request, sends a scheduled backup request with the necessary parameters to trigger the backup on the host backup client (e.g., Avamar backup client). In other words, in a specific embodiment, the backup server does not send the request merely based on a pre-set time interval. The determination of the threshold values may be based on one or more (e.g., multiple) factors. The values for the factors are user configurable as well based on the customer environmental needs or SLAs. Below are some example threshold values.

1) Data change rate: More than 2 percent
2) System/Application work load: Less than 60 percent
3) Maximum time interval between backups: e.g., 1 hour In a specific embodiment, if any of the above conditions are met, a backup request is triggered from the new client module or agent to the backup server (e.g., Avamar backup server). The backup server processes the request and sends a backup work order to the client. Thus, the backup scheduler is smart/intelligent as backups may be initiated based on client data such as data change rate, system/application load, and so forth. Hence the backups are smarter and efficient which is not the case with traditional policy-based schedule backups.

Figure 2:
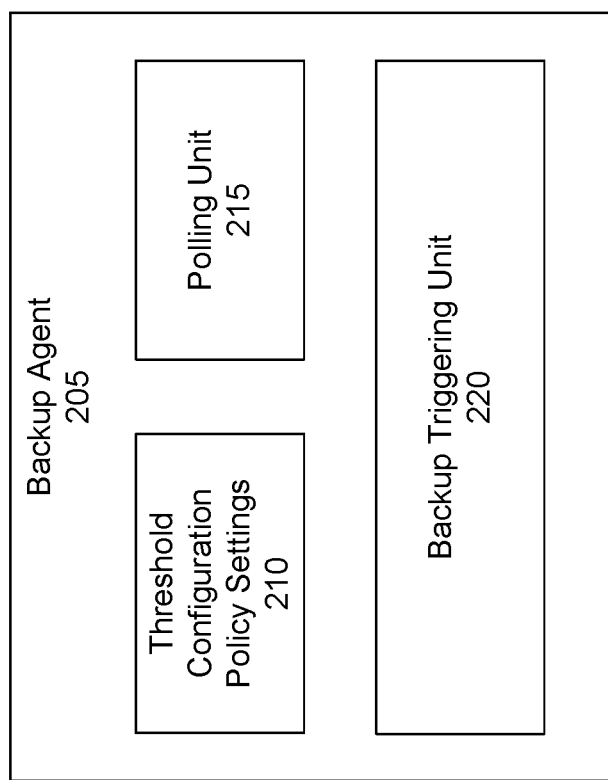
FIG. 2 shows a block diagram of components of a backup agent, according to one or more embodiments.

FIG. 2 shows a block diagram of a backup agent or module 205. As shown in the example of FIG. 2, the agent includes several units or components including, for example, threshold configuration policy settings 210, a polling unit 215, and a backup triggering unit 220. It should be appreciated that the components and modules shown in FIG. 2 and elsewhere can be functional entities. There can be many different hardware and software configurations that may be used to implement the desired functions.

The threshold configuration policy settings store threshold limits associated with the triggering of a backup. One or more threshold limits may be user-configurable such as by a customer of the backup system. Other of one or more threshold limits may be system settings that are not user-configurable.

In a specific embodiment, a first threshold limit may be defined that corresponds to a data change rate or amount at which a backup is triggered. The first threshold limit may be specified as a specific amount or size of changed data (e.g., 1 gigabyte (GB)) since a last backup, or as a percentage of changed data since the last back up (e.g., 2 percent). A second threshold limit may be defined that corresponds to a maximum time interval or elapsed amount of time at which a backup is triggered. The second threshold limit may be specified as a specific duration of time (e.g., 30 minutes, 45 minutes, 1 hour, 2 hours, 3 hours, 4 hours, 8 hours, and so forth). A third threshold limit may be defined that specifies a client resource usage level below which a backup may be performed. A fourth threshold limit may be defined that specifies a client resource usage level above which a backup may be prevented from occurring. Basing the triggering of a backup on client resource usage helps to ensure that a client that is in the midst of processing a large production workload is not overburdened with having to also process a backup.

These threshold configuration policies govern the conditions under which backups are (or are not) triggered and provide great flexibility in structuring service level agreements for each individual customer. Threshold settings or limits in the policies may correspond to terms provided in the SLAs. Different customers may have different SLAs and, in turn, different threshold configuration policies may be associated with different customers. Rather than having a backup be initiated at a specific time, backups can be initiated based on an evaluation of other factors such as the amount of changed data, elapsed time since the last backup, and current resource utilization. The consideration of such factors helps to reduce the likelihood of large amounts of data being lost between backups and helps to ensure that backup activity does not result in overburdening compute and other resources that may currently be processing other production tasks, requests, and workloads.

In a specific embodiment, the threshold configuration policies may be defined at a central location such as at the backup management server and then deployed to each of the clients. For example, the backup management server may include a policy authoring module that allows users to create, manage, and update backup policies including the various threshold limits at which a backup may or may not be triggered. These policies (and associated threshold limit settings) may then be distributed from the backup management server to each of the clients that are to be backed up for evaluation.

The polling unit is responsible for monitoring and collecting metrics such as the amount of changed data since a last backup, current resource usage, tracking the amount of time elapsed since the last backup, tracking performance counters, and so forth. In a specific embodiment, the polling unit periodically polls a virtual machine manager or storage array of the clients to measure the amount of data changed since the last backup. In a specific embodiment, the polling unit interfaces with the resilient change tracking (RCT) API as provided in the Hyper-V virtualization platform to obtain the number of changed data blocks in the virtual disks of the virtual machines. The number of changed data blocks since a last backup can indicate an amount of data that changed since the last backup. Similarly, current usage of resources may also be obtained by the polling unit. For example, the polling unit may periodically poll an operating system of the client or virtual machine manager to obtain current resource usage information or performance information such as processor usage, network usage, memory usage, storage operation performance, number of active processes, and the like.

In a specific embodiment, the polling frequency is every 10 seconds. However, the polling frequency can be defined as any interval of time. There can be other polling frequencies (e.g., poll every 3 seconds, poll every 5 seconds, poll every 30 seconds, and so forth). Different metrics may be associated with different polling frequencies. For example, polling to measure the amount of changed data since the last backup may be conducted or performed at a first frequency. Polling to obtain current resource usage may be conducted or performed at a second frequency, different from the first frequency. Having different polling frequencies helps to balance efficiency and the need for up-to-date metrics or information as the polling itself can consume resources. In a specific embodiment, current resource usage may be an average value calculated within about 1 minute of system resource usage.

The backup triggering unit is responsible for evaluating or analyzing the threshold configuration policy settings with the metric information obtained from the polling unit, and, based on the evaluation, determining whether or not a backup request to the backup management server should be triggered. The analysis may include performing mathematical calculations, comparing a collected metric against a corresponding threshold limit setting, and weighing or evaluating multiple factors to determine whether the backup should be triggered. For example, in a specific embodiment, a backup may be triggered upon determining that the amount of changed data or time elapsed since a last backup exceeded particular threshold limits. However, in a specific embodiment, even if these threshold limits were not exceeded, a backup may still be triggered regardless based on factors such as the degree to which the limits were reached, current resource usage, or both. This multi-factor approach to backups facilitates balancing the often competing demands of data protection and judicious use of computer or system resources (e.g., CPU, network, and so forth).

Figure 3:
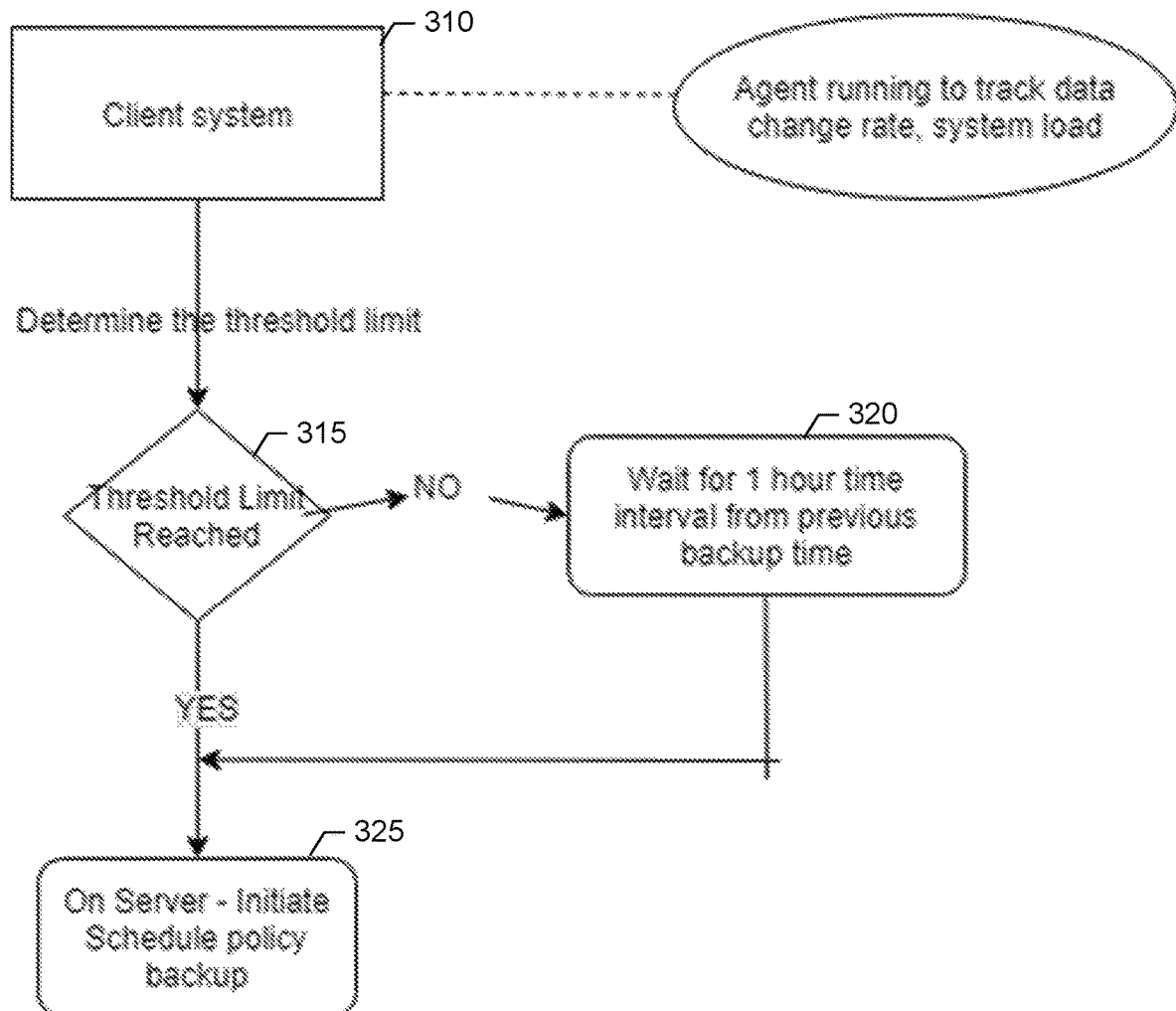
FIG. 3 shows a flow of a client data driven smart backup scheduler, according to one or more embodiments.

FIG. 3 shows an overall flow for client data driven smart backups according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, a client system is provided with an agent that runs on the client system to track and monitor a set of parameters such as a data change rate, system load, and so forth. Threshold limits are determined and a determination is made as to whether a threshold limit has been reached (step 315). If the threshold limit has not been reached, a delay is imposed as measured from a previous or last backup time (step 320). In a specific embodiment, the delay is 1 hour. For example, with a 1-hour delay, the system waits for a duration of 1 hour since the previous or last backup to initiate a next backup. The delay may be any duration of time. The amount of delay may be configurable such as by a customer user of the system. In a step 325, if the threshold limit has been reached or the time of delay has expired, a backup may be initiated.

As an example, consider that the threshold limit for data change is 1 GB. In this example, if the data change rate (DCR) crosses the corresponding threshold limit of 1 GB then a scheduled backup will be triggered. If not, the backup system (e.g., backup agent) enters a sleep/wait state. As another example, consider that the threshold limit for backup time intervals is 1 hour. In this example, if the backup time interval elapses the corresponding threshold limit of 1 hour, a scheduled backup will be triggered. If not, the backup system (e.g., backup agent) enters a sleep/wait state.

Figure 4:
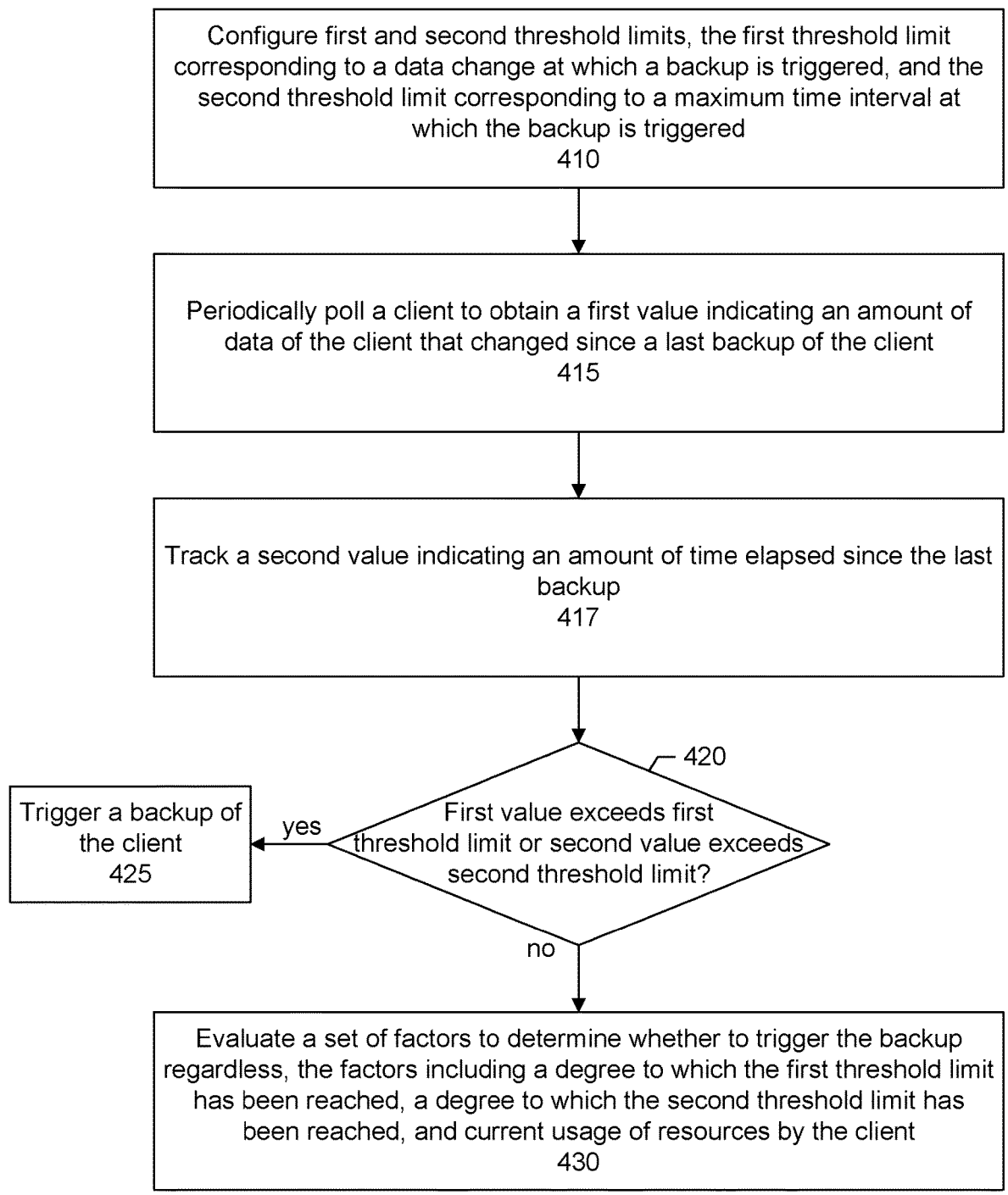
FIG. 4 shows another flow of a client data driven smart backup scheduler, according to one or more embodiments.

FIG. 4 shows another flow for client data driven smart backups according to one or more embodiments. In a step 410, first and second threshold limits are configured. In a specific embodiment, the first threshold limit corresponds to a data change at which a backup is triggered, and the second threshold limit corresponds to a maximum time interval at which the backup is triggered.

In a step 415, a client is periodically polled to obtain a first value indicating an amount of data of the client that changed since a last backup of the client. For example, in a specific embodiment, a change block tracking module, such as RCT as provided in Windows Server, may maintain a bitmap or other mechanism to track blocks on a virtual hard drive that changed since a last backup. The backup agent may review the bitmap or request a review of the bitmap to obtain a count or number of the blocks that have changed. The backup agent may determine the amount of data that has changed based on the number of blocks that have changed and the block size (e.g., multiply number of changed blocks by block size). Alternatively, the data change may be calculated as a percentage such as by dividing the number of changed blocks by the total number of blocks on the virtual hard drive.

In a step 417, a second value is tracked indicating an amount of time elapsed since the last backup.

In a step 420, a determination is made as to whether the first value exceeds the first threshold limit or the second value exceeds the second threshold limit. The determination may include, for example, comparing the first value to the first threshold limit, comparing the second value to the second threshold limit, or both.

If the first value exceeds the first threshold limit or the second value exceeds the second threshold limit, a backup of the client is triggered (step 425).

Alternatively, in a step 430, if neither the first value exceeds the first threshold limit nor the second value exceeds the second threshold limit, a set of factors is evaluated, weighed, or analyzed to determine whether to trigger the backup regardless, i.e., perform the backup even though the first value did not exceed the first threshold limit, the second value did not exceed the second threshold limit, or both.

In a specific embodiment, the factors include a degree to which the first threshold limit has been reached, a degree to which the second threshold limit has been reached, and current usage of resources by the client.

Figure 5:
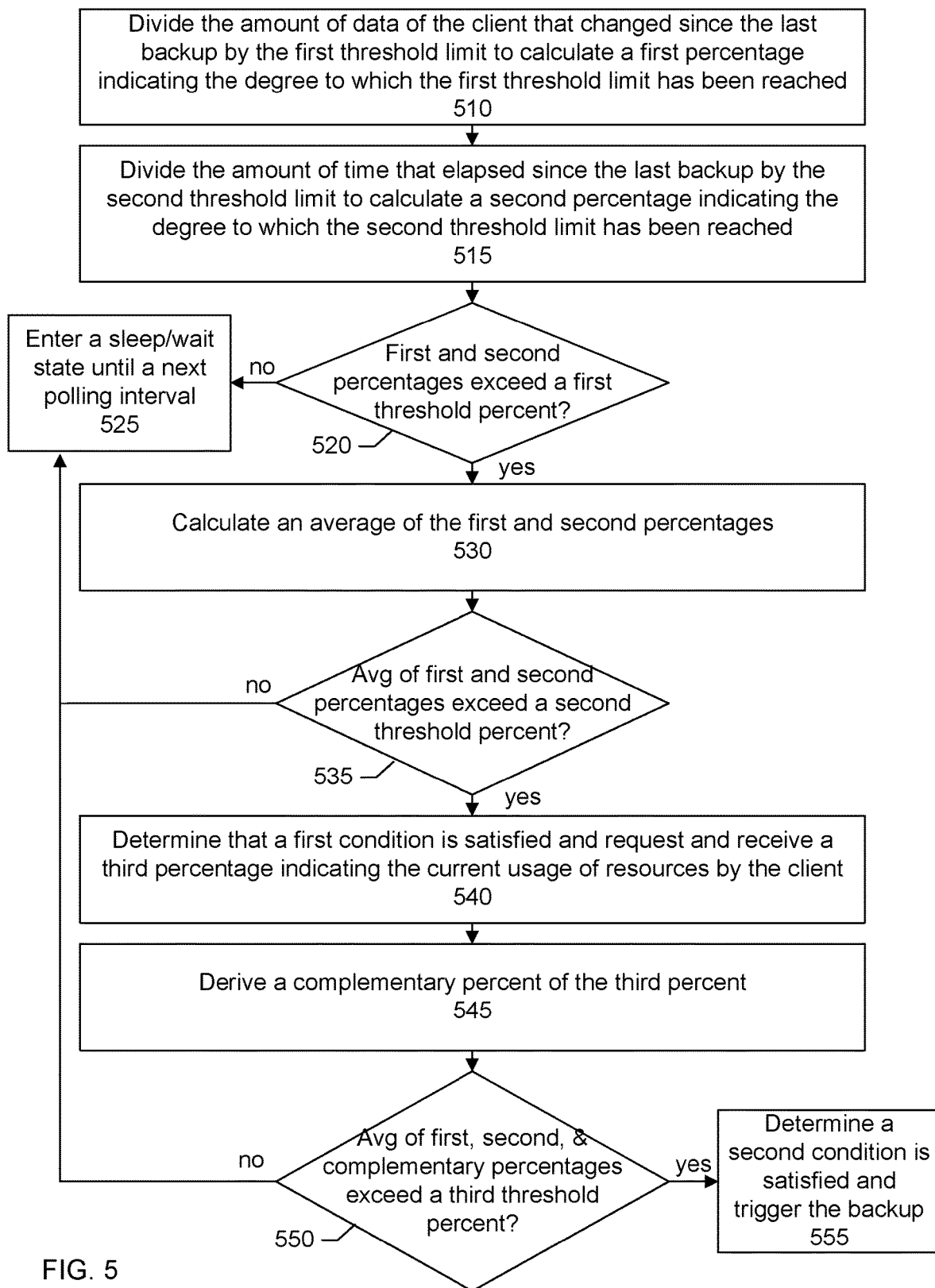
FIG. 5 shows another flow of a client data driven smart backup scheduler, according to one or more embodiments.

FIG. 5 shows a detailed flow for determining whether or not to proceed with a backup of the client regardless of the first value (e.g., data change since the last backup) not exceeding the first threshold limit and the second value (e.g., time elapsed since the last backup) not exceeding the second threshold limit, according to one or more embodiments.

More particularly, in a specific embodiment, in a step 510, the first value (e.g., amount of data of the client that changed since the last backup of the client) is divided by the first threshold limit to calculate a first percentage indicating the degree to which the first threshold limit has been reached.

In a step 515, the second value (e.g., amount of time elapsed since the last backup) is divided by the second threshold limit to calculate a second percentage indicating the degree to which the second threshold limit has been reached.

In a step 520, a determination is made as to whether the first and second percentages exceed a first threshold percent. In a specific embodiment, the first threshold percent is 25 percent. In a specific embodiment, the first threshold percent is a user-configurable value that a customer user can define. In another specific embodiment, the first threshold percent is a system variable that cannot be edited by the customer user.

If the first and second percentages do not exceed the first threshold percent, the system (e.g., backup agent) enters a sleep/wait state until a next polling interval (step 525).

Alternatively, if the first and second percentages exceed the first threshold percent, an average of the first and second percentages is calculated (step 530). In another specific embodiment, there can be another threshold percent, different from the first threshold percent, at which one of the first or second percentages is compared against. For example, rather than the first and second percentages being compared against the same threshold percent, the first and second percentages may be compared against different threshold percentages.

In a step 535, an average of the first and second percentages is calculated and a determination is made as to whether the average of the first and second percentages exceed a second threshold percent. In a specific embodiment, the second threshold percent is 50 percent. In a specific embodiment, the second threshold percent is a user-configurable value that a customer user can define. In another specific embodiment, the second threshold percent is a system variable that cannot be edited by the customer user.

If the average of the first and second percentages do not exceed the second threshold percent, the backup agent enters the sleep/wait state until the next polling interval (step 525).

Alternatively, if the average of the first and second percentages do exceed the second threshold percent, a determination is made that a first condition is satisfied (step 540). The backup agent requests and receives current resource usage information, the current resource usage information thereby being a third percentage. For example, the backup agent may request and receive information about current processor utilization, host workload, network utilization, memory utilization, or other metric indicating current system load, client load, and the like. The backup agent may combine two or more utilization metrics into a composite by averaging the utilization information into a composite value, the composite value being the third percentage.

In a step 545, a complementary percent of the third percentage is derived or calculated. The complementary percent may be calculated by subtracting the third percentage from 100 percent. For example, if the third percentage is 95 percent, the complementary percent is 5 percent (e.g., 100 percent−95 percent=5 percent). As another example, if the third percentage is 10 percent, the complementary percent is 90 percent (e.g., 100 percent−10 percent=90 percent).

In a step 550, an average of the first, second, and complementary percentages is calculated. A determination is made as to whether the average exceeds a third threshold percent. In a specific embodiment, the third threshold percent is 70 percent. In a specific embodiment, the third threshold percent is a user-configurable value that a customer user can define. In another specific embodiment, the third threshold percent is a system variable that cannot be edited by the customer user.

If the average of the first, second, and complementary percentages does not exceed the third threshold percent, the backup agent enters the sleep/wait state until the next polling interval (step 525).

Alternatively, if the average of the first, second, and complementary percentages does exceed the third threshold percent, the backup agent determines that a second condition is satisfied and the backup agent triggers a backup of the client (step 555).

The algorithm shown in FIG. 5 provides a high level of flexibility, customizability, and a multi-dimensional and balanced approach as to whether or not a backup should be triggered. Specifically, backups are desirable because there are many ways in which data can be lost. Having a backup of data helps to ensure business continuity. Backups, however, consume resources such as processing cycles, network bandwidth, disk IOs, and so forth. If, for example, a client host is currently processing a heavy production workload or a large number of production requests, a backup of the client may lead to a delay in the production processing. For example, an e-commerce site, airline reservation system, and so forth may experience long delays in processing orders and flight reservations, respectively.

Consider, as an example, that the first threshold limit (or data change rate) has been configured as 1 gigabyte (GB) and there is 400 megabytes (MB) of changed data since the last backup. Further consider that the second threshold limit (or maximum time interval between backups) has been configured as 1 hour and it has been 50 minutes since the last backup.

Given these parameters, a backup may not initially be triggered since the data change rate does not exceed the first threshold limit (e.g., 400 MB is less than 1 GB); nor does the time elapsed since the last backup exceed the second threshold limit (e.g., 50 minutes is less than 1 hour).

However, a backup may still proceed provided certain conditions are met or satisfied. Assume, for purposes of example, that the first threshold percent is set or configured at 25 percent, the second threshold percent is set at 50 percent, and the third threshold percent is set at 70 percent.

In this example, 40 percent of the first threshold limit or data change rate has been reached (e.g., 400 MB/1 GB=40 percent) (step 510); and 83 percent of the second threshold limit or backup time elapsed has been reached (e.g., 50 minutes/60 minutes=83 percent) (step 515). In this example, the degree to which the first threshold limit has been reached (e.g., 40 percent) and the degree to which the second threshold limit has been reached (e.g., 83 percent) exceed the first threshold percent (e.g., 25 percent). Thus, an average of the degrees to which the threshold limits have been reached is calculated (step 530). In this example, the average is 62 percent (e.g., (40 percent+83 percent/2)=62 percent) and the average exceeds the second threshold percent (e.g., 62 percent is greater than 50 percent).

Thus, a determination is made that the first condition is satisfied (step 540). However, in an embodiment, the algorithm further weighs and examines current resource usage to determine whether the backup should be triggered.

Assume, for example, that current usage of resources is reported or calculated as 95 percent. The complementary percent is calculated (step 545). In this example, the complementary percent of 95 percent is 5 percent (e.g., 100 percent−95 percent=5 percent).

An average of the first, second, and complementary percentages is calculated. In this example, the average is 43 percent (e.g., (40 percent+83 percent+5 percent)/3=43 percent). Calculating the complementary percent helps to normalize or make consistent the averaging as resource utilization may be reported with respect to a measurement of resources used. In other embodiments, resource utilization may be reported with respect to a measurement of resources available. In these embodiments, a complementary percent may not be calculated and the reported value may be used in the averaging calculation of the first and second percentages directly.

In this example, the average of the first, second, and complementary percentages is less than the third threshold percent (e.g., 43 percent is less than 70 percent). Thus, a backup would not be triggered. In this example, the client is heavily loaded as the current resource utilization is 95 percent. Thus, not triggering the backup helps to ensure that the client is not further burdened with performing a backup. The backup may be postponed to a later time when the client is not so heavily loaded.

As another example, however, consider that the current usage of resources is instead reported or calculated as 10 percent. The complementary percent is then calculated as 90 percent (e.g., 100 percent−10 percent=90 percent). The average of the first, second, and complementary percent is 71 percent (e.g., (40 percent+83 percent+90 percent)/3=71 percent). Thus, in this example (where the client has a relatively low load of 10 percent resource utilization), a backup would be triggered (e.g., 71 percent is greater than 70 percent).

In a specific embodiment, one or more of the first, second, and third percentages are user-configurable at the customer-level. This allows each individual customer to customize the various conditions under which a backup is or is not triggered. For example, some customers may prioritize data protection in which case a customer may set a low bar at which backups are triggered. Other customers, however, may prioritize performance of the clients. These customers may set a higher bar at which backups are triggered. The bar at which backups are triggered can be controlled by setting the desired threshold limits or percentages associated with data change, duration or time interval between backups, current system resource usage, or combinations of these.

Consider, as an example, that there are first and second customers, where the first customer prioritizes data protection and the second customer prioritizes performance of the clients. The first customer can set a data change threshold limit to a first value, and set a threshold resource utilization below which a backup is allowed to be triggered to a second value. The second customer can set their corresponding data change threshold limit to a third value, different from the first value, and set their corresponding threshold resource utilization to a fourth value, different from the second value. In this example, the first value may be less than the third value; and the second value may be greater than the fourth value. For example, the first customer may set the data change threshold limit to 1 GB and the threshold resource utilization to 80 percent. The second customer may set the data change threshold limit to 2 GB and the threshold resource utilization to 70 percent. In this example, the bar at which a backup is triggered for the first customer is thus lower than the bar at which a backup for the second customer is triggered.

The ability to fine-tune and manipulate the parameters and criteria at which backups are triggered can improve the functioning, value, and efficiency of the network computer or information processing system. For example, it may not be desirable to perform a backup (and consume compute and network resources) when there is relatively little changed data to backup and the client is currently experiencing high production loads. Conversely, it may be desirable to perform a backup—even though the prescheduled backup time has not arrived—when there is a relatively large amount of changed data and the client is currently idle.

Referring back now to step 415, FIG. 4, in a specific embodiment, the backup agent may obtain information about the changed data by interfacing directly through an API provided by a virtual machine manager. For example, the backup agent may issue a request through the API for the number of blocks changed since the last backup.

In some cases, however, the virtual machine manager may not provide a mechanism to simply query for the number of changed blocks. For example, in some cases, the virtual machine manager may reset a changed block tracking mechanism or bitmap following a changed block request in the belief that these changed blocks will be backed up by the backup agent.

As discussed above, however, it may not be desirable to proceed with the backup at a present time based on, for example, there being a relatively small amount of changed data, the client currently experiencing a high production load, or both. Thus, the backup may be postponed to a later time such as when there is a greater amount of changed data to backup, when the load on the client has decreased, or both. If, however, the backup is postponed and the changed block tracking mechanism is reset, there may be a loss of backup data as the changed block tracking mechanism may not again report the changes from the initial request. Thus, in a specific embodiment, the backup system or backup agent may save or maintain a listing of changed blocks in the event that a backup is postponed. In this specific embodiment, upon the arrival of a next polling interval, the backup agent may calculate the amount of changed data by also taking into account the changed blocks reported from one or more previous polling intervals to determine whether the backup should now proceed. In another specific embodiment, the backup agent may obtain information about the changed data by accessing and reviewing a changed block file or bitmap that may be maintained by the change block tracking mechanism and without directly querying the change block tracking mechanism so that the mechanism is not reset.

In a specific embodiment, a method includes configuring a first threshold limit corresponding to a data change at which a backup of a client hosting a virtual machine is triggered; issuing, at a current polling interval, a first request to a virtual machine manager to obtain a first listing of blocks of the virtual machine that have changed since a last backup; determining that the backup should be postponed; upon the determination that the backup should be postponed, storing the first listing; issuing, at a next polling interval, a second request to the virtual machine manager to obtain a second listing of blocks of the virtual machine, the second listing of blocks comprising blocks that have changed since the first request, and not comprising blocks that did not change since the last backup; combining the second listing of blocks with the first listing of blocks to calculate a total amount of changed data since the last backup; comparing the total amount of changed data to the first threshold limit; and performing the backup based on the comparison. If the total amount of changed data exceeds the first threshold limit, the backup of blocks listed in the first and second listings may proceed. Alternatively, if the total amount of changed data still does not exceed the first threshold limit, the backup may be again postponed (and the second listing of blocks stored or maintained).

Figure 6:
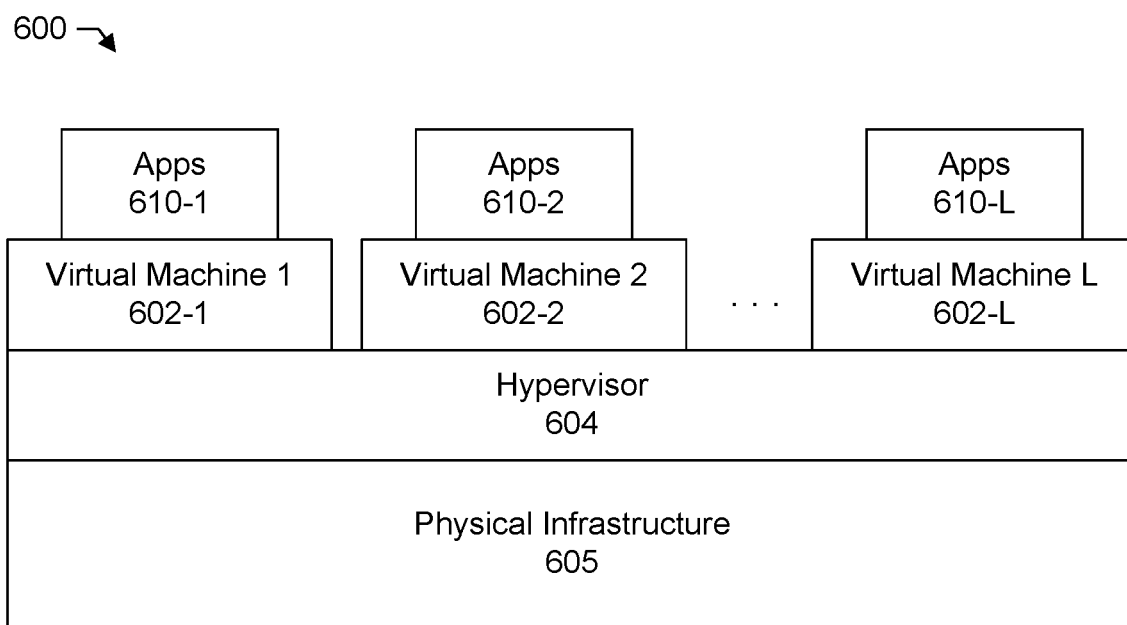
FIG. 6 shows a block diagram of a processing platform that may be utilized to implement at least a portion of an information processing system, according to one or more embodiments.

FIG. 6 shows an example of an information processing platform comprising cloud infrastructure 600 in which client data driven smart backup scheduling may be used. The cloud infrastructure 600 comprises a combination of physical and virtual processing resources that may be utilized to implement at least a portion of information processing system 100 (FIG. 1). The cloud infrastructure 600 comprises virtual machines (VMs) 602-1, 602-2, ... 602-L implemented using a hypervisor 604. The hypervisor runs on physical infrastructure 605. The cloud infrastructure 600 further comprises sets of applications 610-1, 610-2, ... 610-L running on respective ones of the virtual machines 602-1, 602-2, ... 602-L under the control of the hypervisor.

Although only a single hypervisor is shown in the embodiment of FIG. 6, the system may include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement the hypervisor and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

Figure 7:
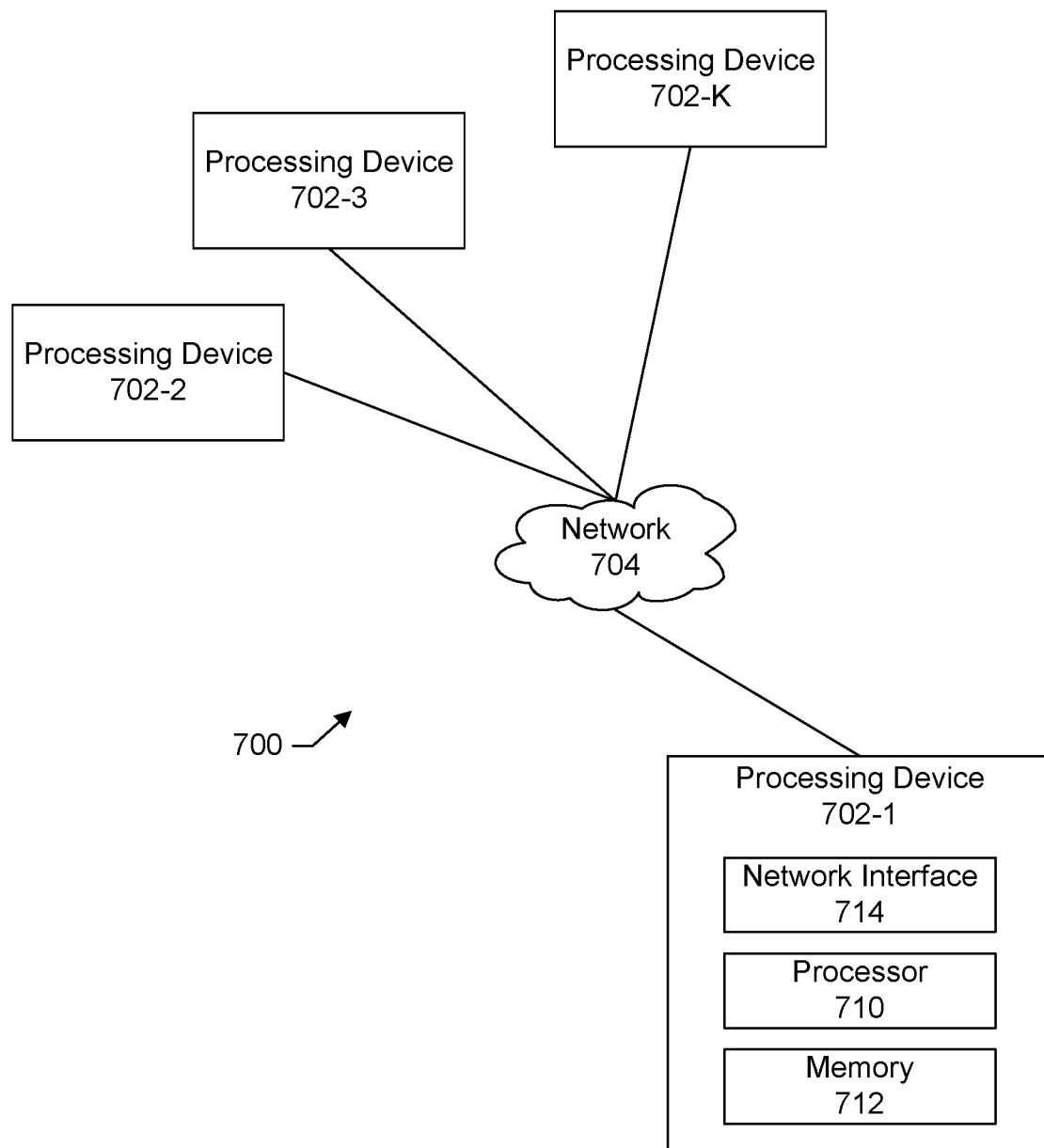
FIG. 7 shows another block diagram of a processing platform that may be utilized to implement at least a portion of an information processing system, according to one or more embodiments.

As is apparent from the above, one or more of the processing modules or other components of the system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 8:
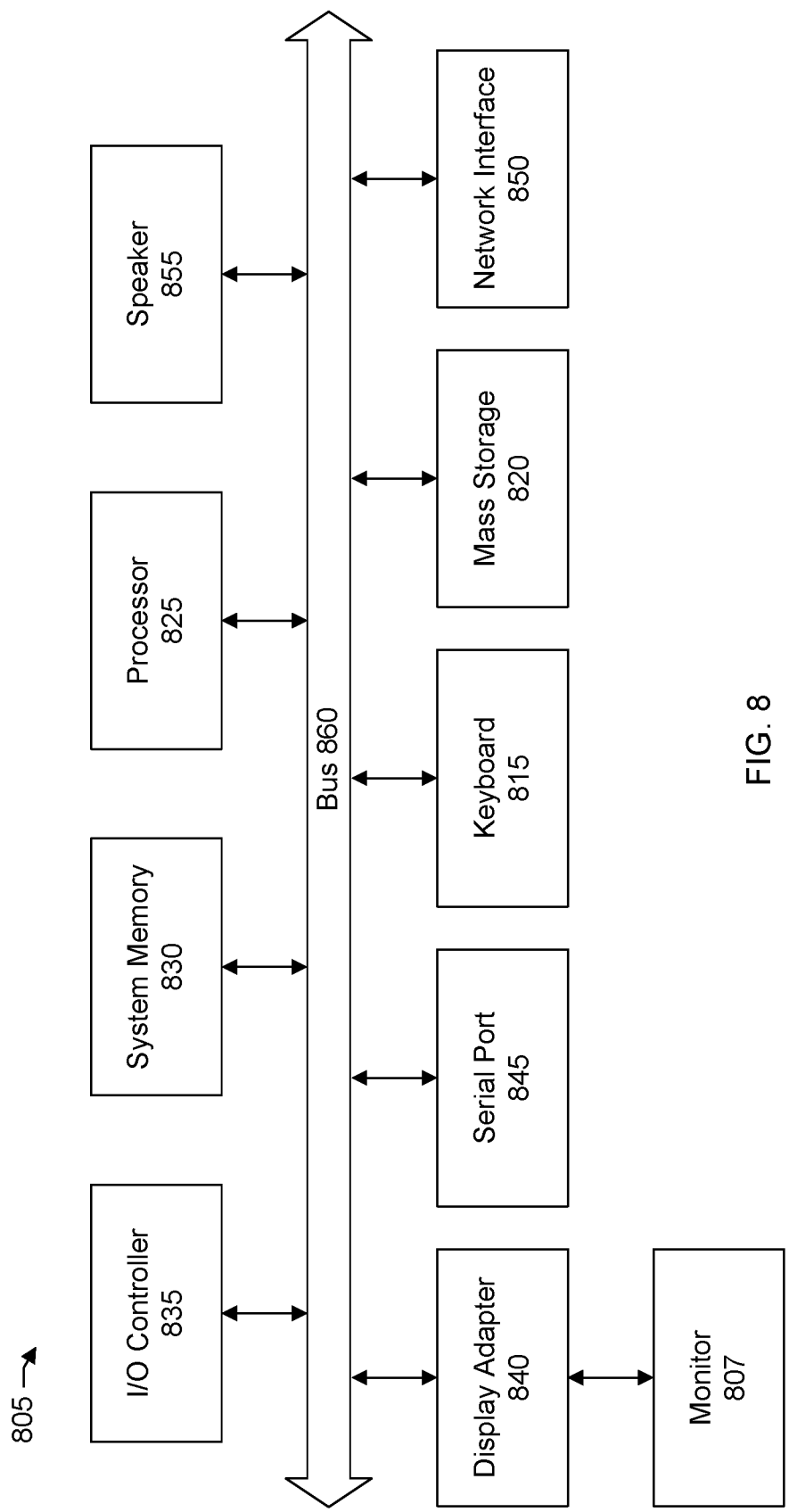
FIG. 8 shows a block diagram of a computer system suitable for use with the system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In a specific embodiment, there is a system comprising: a processor; and memory configured to store one or more sequences of instructions which, when executed by the processor, cause the processor to carry out the steps of: configuring first and second threshold limits, the first threshold limit corresponding to a data change at which a backup is triggered, and the second threshold limit corresponding to a maximum time interval at which the backup is triggered; periodically polling a client to obtain a first value indicating an amount of data of the client that changed since a last backup of the client; tracking a second value indicating an amount of time that elapsed since the last backup; determining whether to trigger a backup of the client based on at least one of the first value exceeding the first threshold limit or the second value exceeding the second threshold limit; and when the backup is not triggered because neither the first value exceeds the first threshold limit nor the second value exceeds the second threshold limit, triggering the backup of the client regardless based on a plurality of factors comprising a degree to which the first threshold limit has been reached, a degree to which the second threshold limit has been reached, and current usage of resources by the client.

In an embodiment, the one or more sequence of instructions which, when executed by the processor, cause the processor to carry out the steps of: trigging the backup regardless when each of first and second conditions have been satisfied, wherein the triggering the backup regardless comprises: dividing the amount of data of the client that changed since the last backup by the first threshold limit to calculate a first percent value, the first percent value indicating the degree to which the first threshold limit has been reached; dividing the amount of time that elapsed since the last backup by the second threshold limit to calculate a second percent value, the second percent value indicating the degree to which the second threshold limit has been reached; determining, for the first condition, whether each of the first and second percent values exceed a first predetermined threshold percent; when each of the first and second percent values exceed the first predetermined threshold percent, determining that the first condition is satisfied when an average of the first and second percent values exceeds a second predetermined threshold percent; obtaining a third percent value, the third percent value indicating the current usage of resources by the client; deriving a complementary percent value of the third percent value; and determining that the second condition is satisfied when an average of the first, second, and complementary percent values exceeds a third predetermined threshold percent.

In an embodiment, the one or more sequence of instructions which, when executed by the processor, cause the processor to carry out the steps of: upon the triggering of the backup, issuing a backup request from the client to a backup management server; and receiving, at the client from the backup management server, a backup work order responsive to the backup request.

In an embodiment, the one or more sequence of instructions which, when executed by the processor, cause the processor to carry out the steps of: associating the first and second threshold limits with a first customer, the first threshold limit thereby being a first data change threshold at which a backup of a first client associated with the first customer is triggered, and the second threshold limit thereby being a first maximum time interval at which the backup of the first client is triggered; configuring, for a second customer, a second data change threshold at which a backup of a second client associated with the second customer is triggered; and configuring, for the second customer, a second maximum time interval at which the backup of the second client is triggered, wherein the first customer is different from the second customer, the first data change threshold is different from the second data change threshold, and the first maximum time interval is different from the second maximum time interval.

The first threshold limit may include a data size value. The second threshold limit comprises a duration of time value.

In another specific embodiment, there is a method comprising: configuring first and second threshold limits, the first threshold limit corresponding to a data change at which a backup is triggered, and the second threshold limit corresponding to a maximum time interval at which the backup is triggered; periodically polling a client to obtain a first value indicating an amount of data of the client that changed since a last backup of the client; tracking a second value indicating an amount of time that elapsed since the last backup; determining whether to trigger a backup of the client based on at least one of the first value exceeding the first threshold limit or the second value exceeding the second threshold limit; and when the backup is not triggered because neither the first value exceeds the first threshold limit nor the second value exceeds the second threshold limit, triggering the backup of the client regardless based on a plurality of factors comprising a degree to which the first threshold limit has been reached, a degree to which the second threshold limit has been reached, and current usage of resources by the client.

In another specific embodiment, there is a computer program product, comprising a non-transitory computer-readable medium having a computer-readable program code embodied therein, the computer-readable program code adapted to be executed by one or more processors to implement a method comprising: configuring first and second threshold limits, the first threshold limit corresponding to a data change at which a backup is triggered, and the second threshold limit corresponding to a maximum time interval at which the backup is triggered; periodically polling a client to obtain a first value indicating an amount of data of the client that changed since a last backup of the client; tracking a second value indicating an amount of time that elapsed since the last backup; determining whether to trigger a backup of the client based on at least one of the first value exceeding the first threshold limit or the second value exceeding the second threshold limit; and when the backup is not triggered because neither the first value exceeds the first threshold limit nor the second value exceeds the second threshold limit, triggering the backup of the client regardless based on a plurality of factors comprising a degree to which the first threshold limit has been reached, a degree to which the second threshold limit has been reached, and current usage of resources by the client.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:
configuring first and second threshold limits, the first threshold limit corresponding to a data change at which a backup is triggered, and the second threshold limit corresponding to a maximum time interval at which the backup is triggered;
periodically polling a client to obtain a first value indicating an amount of data of the client that changed since a last backup of the client;
tracking a second value indicating an amount of time that elapsed since the last backup;
determining whether to trigger a backup of the client based on at least one of the first value exceeding the first threshold limit or the second value exceeding the second threshold limit; and
when the backup is not triggered because neither the first value exceeds the first threshold limit nor the second value exceeds the second threshold limit, triggering the backup of the client regardless based on a degree to which the first threshold limit has been reached, a degree to which the second threshold limit has been reached, and current usage of resources by the client,
wherein the triggering the backup regardless comprises:
dividing the amount of data of the client that changed since the last backup by the first threshold limit to calculate a first percent value, the first percent value indicating the degree to which the first threshold limit has been reached;
dividing the amount of time that elapsed since the last backup by the second threshold limit to calculate a second percent value, the second percent value indicating the degree to which the second threshold limit has been reached;
determining, for the first condition, whether each of the first and second percent values exceed a first predetermined threshold percent;
when each of the first and second percent values exceed the first predetermined threshold percent, determining that the first condition is satisfied when an average of the first and second percent values exceeds a second predetermined threshold percent;
obtaining a third percent value, the third percent value indicating the current usage of resources by the client;
deriving a complementary percent value of the third percent value; and
determining that the second condition is satisfied when an average of the first, second, and complementary percent values exceeds a third predetermined threshold percent.

2. The system of claim 1 wherein the one or more sequence of instructions which, when executed by the processor, cause the processor to carry out the steps of:
upon the triggering of the backup, issuing a backup request from the client to a backup management server; and
receiving, at the client from the backup management server, a backup work order responsive to the backup request.

3. The system of claim 1 wherein the one or more sequence of instructions which, when executed by the processor, cause the processor to carry out the steps of:
associating the first and second threshold limits with a first customer, the first threshold limit thereby being a first data change threshold at which a backup of a first client associated with the first customer is triggered, and the second threshold limit thereby being a first maximum time interval at which the backup of the first client is triggered;
configuring, for a second customer, a second data change threshold at which a backup of a second client associated with the second customer is triggered; and
configuring, for the second customer, a second maximum time interval at which the backup of the second client is triggered, wherein the first customer is different from the second customer, the first data change threshold is different from the second data change threshold, and the first maximum time interval is different from the second maximum time interval.

4. The system of claim 1 wherein the first threshold limit comprises a data size value.

5. The system of claim 1 wherein the second threshold limit comprises a duration of time value.

6. A method comprising:
configuring first and second threshold limits, the first threshold limit corresponding to a data change at which a backup is triggered, and the second threshold limit corresponding to a maximum time interval at which the backup is triggered;
periodically polling a client to obtain a first value indicating an amount of data of the client that changed since a last backup of the client;
tracking a second value indicating an amount of time that elapsed since the last backup;
determining whether to trigger a backup of the client based on at least one of the first value exceeding the first threshold limit or the second value exceeding the second threshold limit; and
when the backup is not triggered because neither the first value exceeds the first threshold limit nor the second value exceeds the second threshold limit, triggering the backup of the client regardless based on a degree to which the first threshold limit has been reached, a degree to which the second threshold limit has been reached, and current usage of resources by the client,
wherein the triggering the backup regardless comprises:
dividing the amount of data of the client that changed since the last backup by the first threshold limit to calculate a first percent value, the first percent value indicating the degree to which the first threshold limit has been reached;
dividing the amount of time that elapsed since the last backup by the second threshold limit to calculate a second percent value, the second percent value indicating the degree to which the second threshold limit has been reached;
determining, for the first condition, whether each of the first and second percent values exceed a first predetermined threshold percent;
when each of the first and second percent values exceed the first predetermined threshold percent, determining that the first condition is satisfied when an average of the first and second percent values exceeds a second predetermined threshold percent;
obtaining a third percent value, the third percent value indicating the current usage of resources by the client;
deriving a complementary percent value of the third percent value; and
determining that the second condition is satisfied when an average of the first, second, and complementary percent values exceeds a third predetermined threshold percent.

7. The method of claim 6 comprising:
upon the triggering of the backup, issuing a backup request from the client to a backup management server; and
receiving, at the client from the backup management server, a backup work order responsive to the backup request.

8. The method of claim 6 comprising:
associating the first and second threshold limits with a first customer, the first threshold limit thereby being a first data change threshold at which a backup of a first client associated with the first customer is triggered, and the second threshold limit thereby being a first maximum time interval at which the backup of the first client is triggered;
configuring, for a second customer, a second data change threshold at which a backup of a second client associated with the second customer is triggered; and
configuring, for the second customer, a second maximum time interval at which the backup of the second client is triggered, wherein the first customer is different from the second customer, the first data change threshold is different from the second data change threshold, and the first maximum time interval is different from the second maximum time interval.

9. The method of claim 6 wherein the first threshold limit comprises a data size value.

10. The method of claim 6 wherein the second threshold limit comprises a duration of time value.

11. A computer program product, comprising a non-transitory computer-readable medium having a computer-readable program code embodied therein, the computer-readable program code adapted to be executed by one or more processors to implement a method comprising:
configuring first and second threshold limits, the first threshold limit corresponding to a data change at which a backup is triggered, and the second threshold limit corresponding to a maximum time interval at which the backup is triggered;
periodically polling a client to obtain a first value indicating an amount of data of the client that changed since a last backup of the client;
tracking a second value indicating an amount of time that elapsed since the last backup;
determining whether to trigger a backup of the client based on at least one of the first value exceeding the first threshold limit or the second value exceeding the second threshold limit; and
when the backup is not triggered because neither the first value exceeds the first threshold limit nor the second value exceeds the second threshold limit, triggering the backup of the client regardless based on a degree to which the first threshold limit has been reached, a degree to which the second threshold limit has been reached, and current usage of resources by the client,
wherein the triggering the backup regardless comprises:
dividing the amount of data of the client that changed since the last backup by the first threshold limit to calculate a first percent value, the first percent value indicating the degree to which the first threshold limit has been reached;
dividing the amount of time that elapsed since the last backup by the second threshold limit to calculate a second percent value, the second percent value indicating the degree to which the second threshold limit has been reached;
determining, for the first condition, whether each of the first and second percent values exceed a first predetermined threshold percent;
when each of the first and second percent values exceed the first predetermined threshold percent, determining that the first condition is satisfied when an average of the first and second percent values exceeds a second predetermined threshold percent;
obtaining a third percent value, the third percent value indicating the current usage of resources by the client;

deriving a complementary percent value of the third percent value; and determining that the second condition is satisfied when an average of the first, second, and complementary percent values exceeds a third predetermined threshold percent.

12. The computer program product of claim 11 wherein the method comprises:

upon the triggering of the backup, issuing a backup request from the client to a backup management server; and receiving, at the client from the backup management server, a backup work order responsive to the backup request.

13. The computer program product of claim 11 wherein the method comprises:

associating the first and second threshold limits with a first customer, the first threshold limit thereby being a first data change threshold at which a backup of a first client associated with the first customer is triggered, and the second threshold limit thereby being a first maximum time interval at which the backup of the first client is triggered;

configuring, for a second customer, a second data change threshold at which a backup of a second client associated with the second customer is triggered; and configuring, for the second customer, a second maximum time interval at which the backup of the second client is triggered, wherein the first customer is different from the second customer, the first data change threshold is different from the second data change threshold, and the first maximum time interval is different from the second maximum time interval.

14. The computer program product of claim 11 wherein the first threshold limit comprises a data size value.

15. The computer program product of claim 11 wherein the second threshold limit comprises a duration of time value.

* * * * *